US005404229A

United States Patent [19]

Ono et al.

[11] Patent Number: 5,404,229

[45] Date of Patent: Apr. 4, 1995

[54] FACSIMILE APPARATUS WITH INK EJECTION RECORDING MEANS RECOVERABLE BETWEEN THE TRANSMISSION OF CONSECUTIVE PAGES OF IMAGE DATA BY ANOTHER FACSIMILE APPARATUS

[75] Inventors: Takeshi Ono; Fumihiko Watanabe, both of Yokohama, Japan

[73] Assignee: Canon Kabushiki Kaisha, Tokyo, Japan

[21] Appl. No.: 78,068

[22] Filed: Jun. 18, 1993

Related U.S. Application Data

[63] Continuation of Ser. No. 879,463, May 4, 1992, abandoned, which is a continuation of Ser. No. 531,709, Jun. 1, 1990, abandoned.

[30] Foreign Application Priority Data

Jun. 2, 1989 [JP] Japan ................................ 1-139318

[51] Int. Cl.6 ...................... H04N 1/034; B41J 2/165

[52] U.S. Cl. ........................................ 358/296; 347/3; 347/23

[58] Field of Search ...................... 358/296; 347/3, 23

[56] References Cited

U.S. PATENT DOCUMENTS

| | | | |
|---|---|---|---|
| 4,333,088 | 6/1982 | Diggins | 347/86 X |
| 4,376,283 | 3/1983 | Bower | 347/3 |
| 4,558,332 | 12/1985 | Takahashi | 347/23 X |
| 4,839,737 | 6/1989 | Saito | 358/296 X |
| 4,897,831 | 1/1990 | Negi et al. | 370/29 |
| 4,910,506 | 3/1990 | Yoshida et al. | 340/825.07 |
| 4,947,191 | 8/1990 | Nozawa | 347/30 |
| 4,963,884 | 10/1990 | Kiguchi et al. | 346/76 PH |
| 4,967,204 | 10/1990 | Terasawa | 347/23 X |
| 4,972,270 | 11/1990 | Kurtin et al. | 358/296 |
| 4,975,780 | 12/1990 | Kuboki | 358/296 |
| 4,977,459 | 12/1990 | Ebinuma | 358/296 |

FOREIGN PATENT DOCUMENTS

| | | | |
|---|---|---|---|
| 166650 | 8/1984 | European Pat. Off. | H04N 1/32 |
| 58-183265 | 10/1983 | Japan | B41J 3/04 |
| 59-052660 | 3/1984 | Japan | B41J 3/04 |

*Primary Examiner*—Joseph W. Hartary
*Attorney, Agent, or Firm*—Fitzpatrick, Cella, Harper & Scinto

[57] ABSTRACT

An image communication apparatus includes a communication unit for communicating a procedure signal associated with communication, and image data, a recording unit for ejecting a liquid droplet onto a recording member in accordance with image data received by the communication unit, a recovery unit for performing a predetermined recovery operation of the recording unit, and a control unit for determining according to a type of procedure signal transmitted from a calling side after reception of image data of one page whether or not the recovery operation by the recovery unit is executed.

33 Claims, 5 Drawing Sheets

FACSIMILE APPARATUS WITH INK EJECTION RECORDING MEANS RECOVERABLE BETWEEN THE TRANSMISSION OF CONSECUTIVE PAGES OF IMAGE DATA BY ANOTHER FACSIMILE APPARATUS

This application is a continuation of application Ser. No. 07/879,463, filed May 4, 1992, now abandoned, which in turn was a continuation of application Ser. No. 07/531,709, filed Jun. 1, 1990, now abandoned.

BACKGROUND OF THE INVENTION

The present invention relates to an image communication apparatus for ejecting a liquid droplet onto a recording member to perform image recording.

In general, a so-called ink-jet recording system for ejecting a droplet of a liquid such as an ink onto a record sheet according to recording information to perform image recording is known.

The ink-jet recording system has the following drawbacks.

(1) The ink-jet recording system often causes a printing error due to evaporation or drying of ink or clogging of nozzles with dust, and in a non-recording state, a preservation operation of a head such as capping is necessary.

(2) In order to suppress such a printing error, head recovery operations such as idle ejection of all the nozzles, an ink supply operation, and the like must be performed before printing, and a considerable time is required until recording is ready.

(3) When a head has a large number of nozzles, in particular, in a line head, a probability of omission of printing dots is increased.

Such drawbacks pose serious problems particularly when the ink-jet recording system is applied to an apparatus which has a relatively long standby time without recording, e.g., an image communication apparatus such as a facsimile.

Therefore, an ink-jet image communication apparatus comprising a recording head having a plurality of nozzles has not been realized yet.

SUMMARY OF THE INVENTION

The present invention has been made in consideration of the above situation, and has as its object to improve an image communication apparatus for ejecting a liquid droplet onto a recording member to record an image.

It is another object of the present invention to provide an image communication apparatus which can efficiently perform a standby operation for next reception and a reception end operation.

It is still another object of the present invention to provide an image communication apparatus which can vary processing of a recording means depending on a type of procedure signal after reception of one page.

It is still another object of the present invention to provide an image communication apparatus which can prevent a printing error when reception is successively performed immediately after reception of one page.

It is still another object of the present invention to provide an image communication apparatus which can shorten a time required until recording is started when reception is successively performed immediately after reception of one page.

It is still another object of the present invention to provide an image communication apparatus which performs recovery processing before image reception, and performs preservation processing upon completion of image reception, so that a recording standby operation for the next page is quickly performed when a plurality of pages are to be received, while a head is shifted to a preservation position as quickly as possible upon completion of recording.

The above and other objects will be apparent from the accompanying drawings and the following description of the preferred embodiment.

BRIEF DESCRIPTION OF THE PREFERRED EMBODIMENTS

FIG. 2-1 is a sectional view of an ink-jet recording apparatus of this embodiment;

FIG. 2-2 is a sectional view showing a preservation position of a recording head;

DETAILED DESCRIPTION OF THE PREFERRED EMBODIMENT

An embodiment of the present invention will be described in detail hereinafter.

A facsimile apparatus exemplified as an embodiment of the present invention has an ink-jet full-line type line head having a length corresponding to a width of the largest record sheet which can be used in recording, a head preservation means which can prevent evaporation and clogging of an ink by, e.g., capping, a head recovery means for performing idle ejection of all the nozzles of the line head or ink supply to prevent a printing error, and means for shifting a head to one of a preservation position, a recovery position, and a print position for performing recording. When the facsimile apparatus receives an EOM (end of message signal) or an MPS (multi page signal) from a transmitting station after reception of one page, it immediately performs a head recovery operation, while when the apparatus receives an EOP (end of procedure signal), it starts a head preservation operation.

Figure 1:
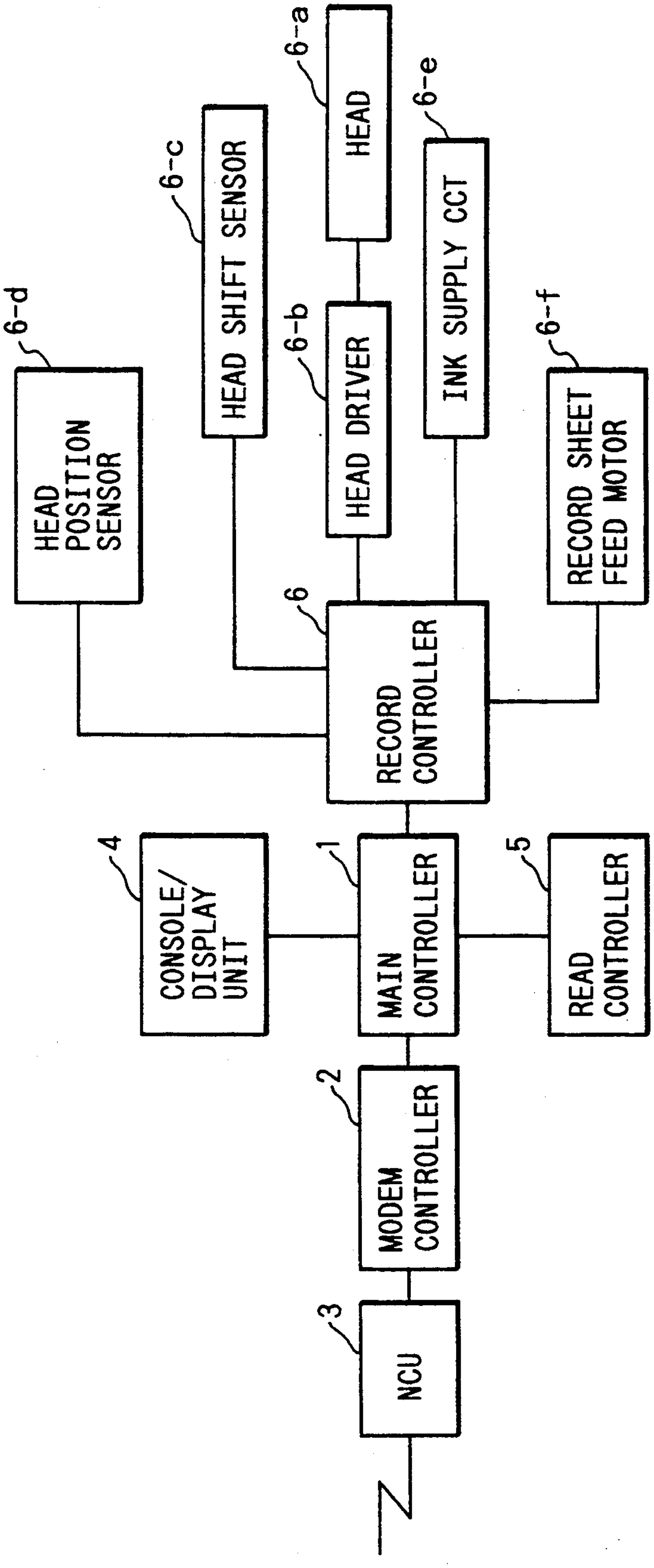
FIG. 1 is a block diagram showing an electrical arrangement of a facsimile apparatus according to an embodiment of the present invention.

FIG. 1 is a block diagram showing an embodiment of a facsimile apparatus to which the present invention is applied. In FIG. 1, a main controller 1 of the facsimile apparatus controls facsimile operations such as reading, recording, communication, and the like. A modem controller 2 is connected to a line through an NCU 3. A console/display unit 4 comprises LCDs or LEDs and key switches. A read controller 5 has CCDs or a contact sensor. A record controller 6 performs recording of an image read by the read controller 5 or an image received by the modem controller 2. The record controller 6 performs printing of data transferred to a head 6-*a* by energizing a head driver 6-*b*. A head shift motor 6-*c* shifts the head to one of the preservation, recovery, and print positions, and a head position detecting sensor 6-*d* detects the position of the head. An ink supply circuit 6-*e* supplies an ink to the line head. The ink supply circuit 6-*e* performs an ink supply operation after an ink cartridge is exchanged or during a head recovery operation. A record sheet feed motor **6-*f*** feeds a record sheet for each one-line printing operation.

Figures 1, 2:
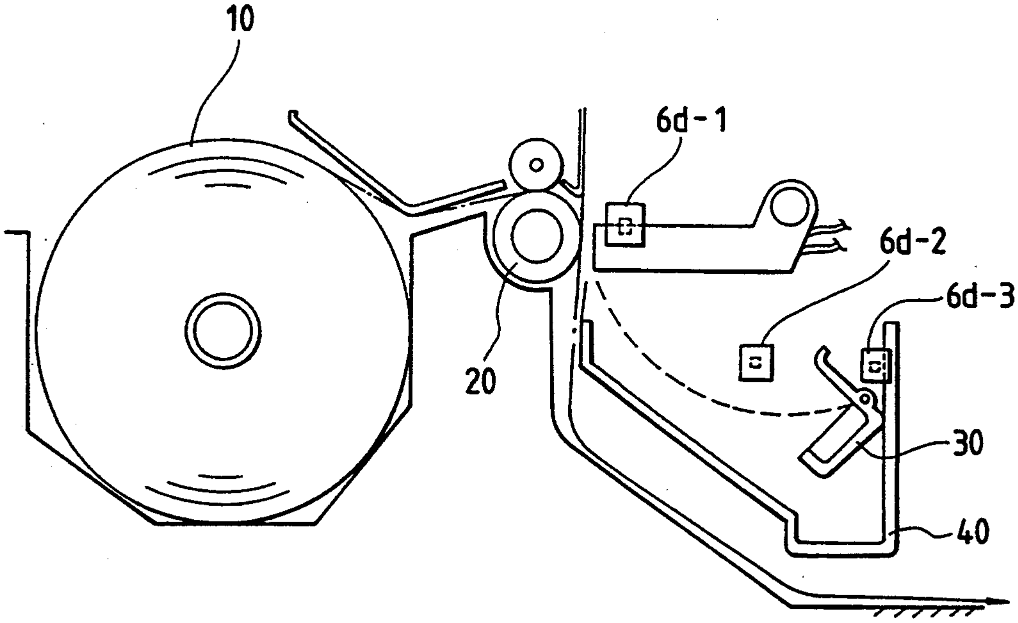
Figure 2:
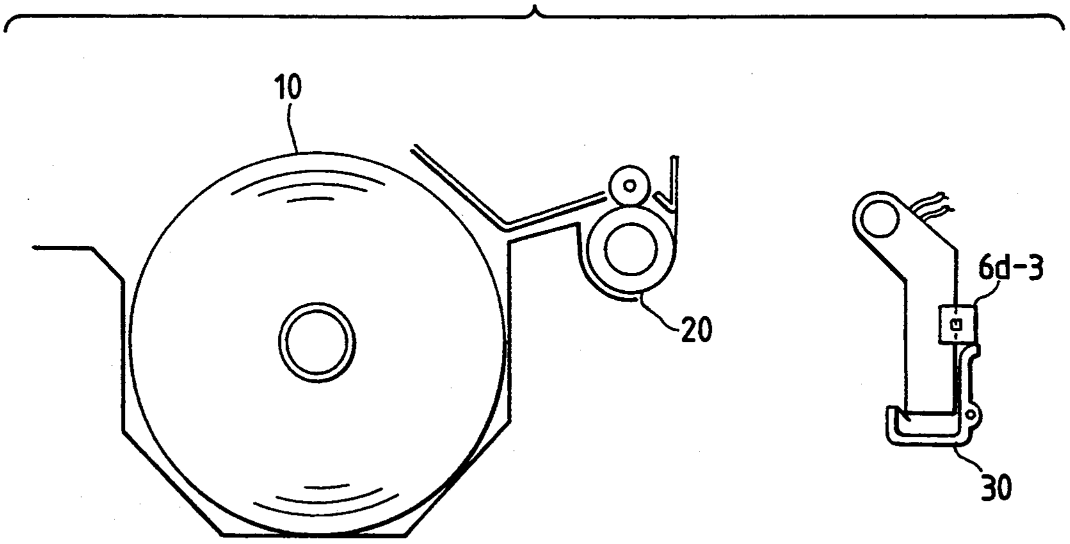

FIG. 2-1 is a cross-sectional view of an ink-jet recording apparatus mounted on the facsimile apparatus shown in FIG. 1. The recording apparatus shown in FIG. 2-1 includes a record sheet 10, a platen roller 20 for feeding the record sheet, an ink-jet head preservation cap 30, and an exhaust ink tray 40. The apparatus also includes a head print position sensor **6*d*-1, a recovery position sensor 6*d*-2, and a preservation position sensor 6*d*-3**.

FIG. 2-2 is a view showing a state wherein the head is located at the preservation position. In this state, the nozzle surface is capped by the preservation cap 30.

Figure 3:
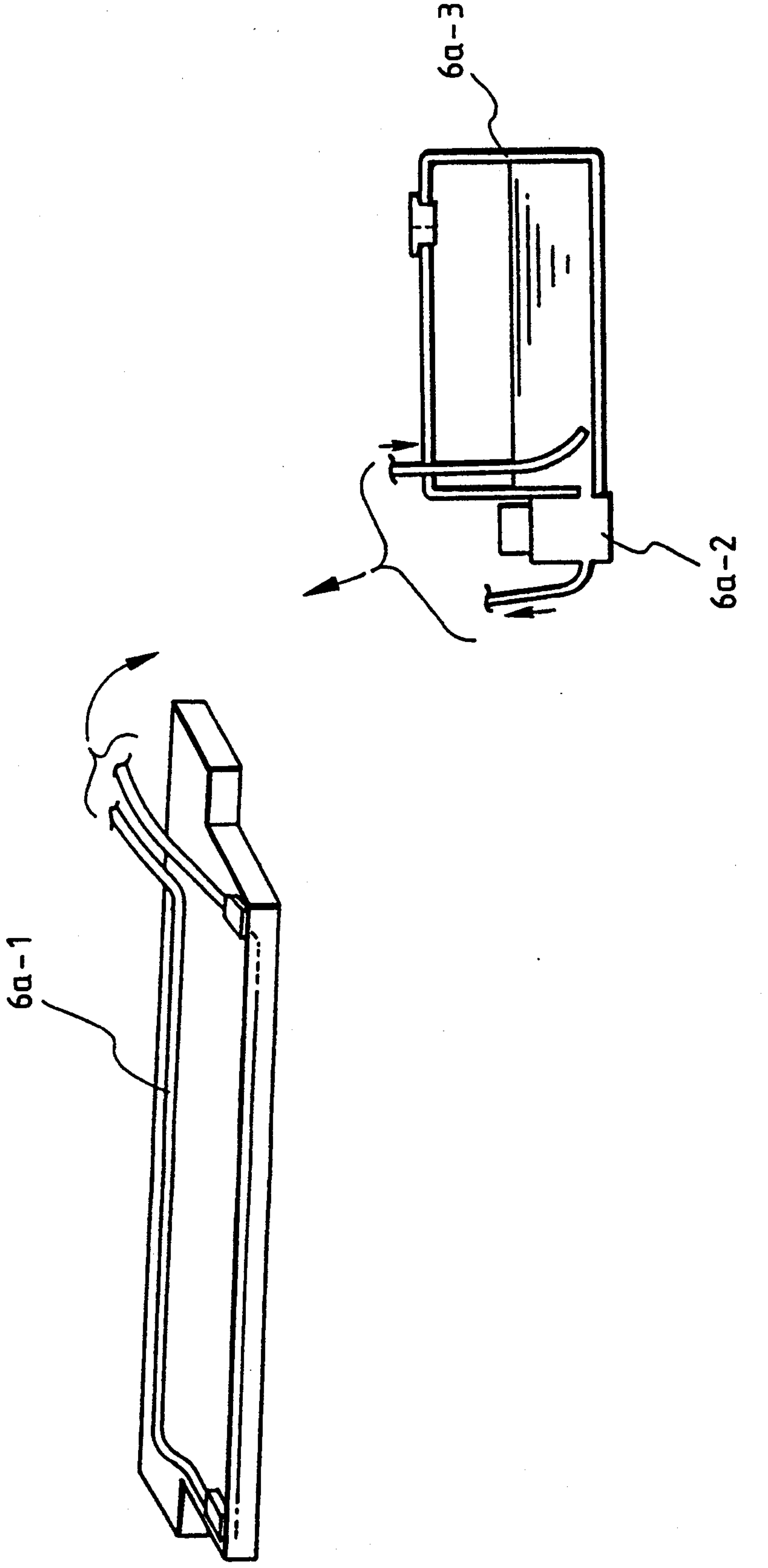
FIG. 3 is a view showing an ink-jet recording head used in this embodiment.

FIG. 3 shows the full-multi ink-jet head used in this embodiment. In this head, nozzles of one line corresponding to the width of the largest record size are aligned. In this case, head piping paths behind the nozzle array are not shown. The head shown in FIG. 3 has an ink supply pipe **6*a*-1**. An ink is supplied from an ink tank by driving a gear pump.

The ink-jet head of this embodiment is of a bubble-jet type. In this head, an electro-thermal conversion element such as a heater is driven according to recording information to generate bubbles, thereby ejecting an ink.

Stop positions and operations of the head will be described below.

When the sensor **6*d*-1 shown in FIG. 2-1 is turned on, the head is located at the print position, and the head driver 6-*b* is turned on to perform recording. When the sensor 6*d*-2 is turned on, the head is located at the recovery position, and causes the ink supply circuit 6-*e* to perform an ink supply operation to recover a printing error caused by clogging of nozzles or evaporation of an ink or causes the head driver 6-*b* to perform an idle ejection operation with all black image information. Thus, an ink is forcibly ejected from ejection ports to remove ink having increased viscosity in the nozzles. The removed ink is received by the exhaust ink tray 40. Furthermore, when the sensor 6*d*-3** is turned on, the head is located at the preservation position, and capping for preventing evaporation and clogging of an ink in a head non-use state is performed.

A gear pump **6*a*-2 shown in FIG. 3 supplies an ink from an ink cartridge 6*a*-3 to the head. The ink supply circuit 6-*e* shown in FIG. 1** is operated to drive this pump, thereby supplying an ink.

The recovery operation includes two kinds of operations, i.e., (1) a method of driving the pump to supply an ink, and (2) an idle ejection method of transferring all black data corresponding to one line of the head to the head, and turning on the head driver **6-*b* (FIG. 1**) to perform a normal all black printing operation at the recovery position.

Figure 4:
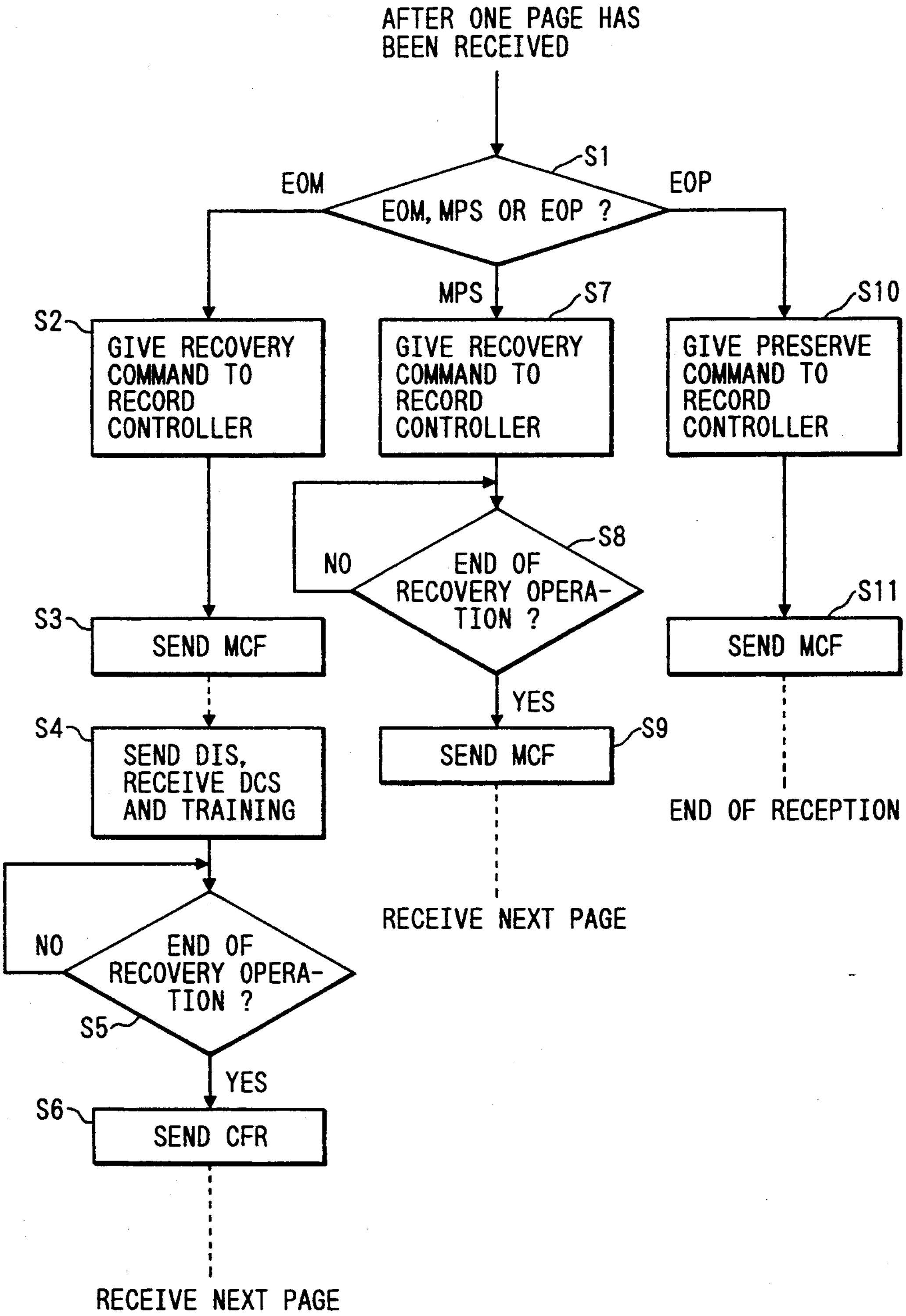
FIG. 4 is a flow chart of a main controller of this embodiment.
Figure 5:
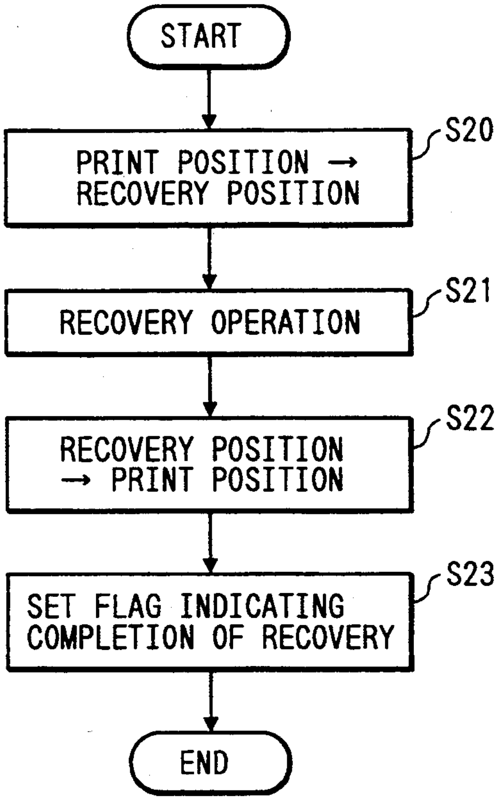
FIGS. 5 and 6 are flow charts of a record controller of this embodiment.
Figure 6:
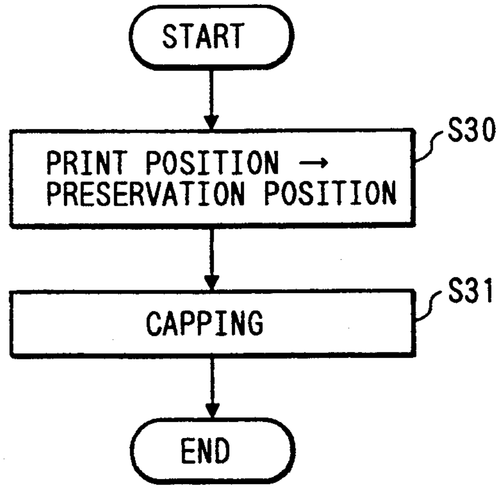

FIG. 4 is a flow chart showing an operation of the main controller 1, FIG. 5 is a flow chart showing a recovery operation of the record controller 6, and FIG. 6 is a flow chart showing a preservation operation of the record controller 6.

The overall operation of the facsimile apparatus of this embodiment will be described below with reference to the flow charts shown in FIGS. 4 to 6.

FIG. 4 is a flow chart of the main controller 1 upon completion of reception of one page. In step S1, it is checked if a Q received from a transmitting side is an EOM (end of message signal), an MPS (multi page signal) or an EOP (end of procedure signal). The EOM and MPS are signals indicating that transmission of one page is completed, and there is a next original. The EOM is output from the transmitting side when a mode is changed. If Q=EOM in step S1, a recovery command is sent to the record controller in step S2, and an MCF (message confirmation signal) is sent to the transmitting side in step S3.

In step S4, training for reception of the next page is performed. In step S5, information indicating completion of a recovery operation from the record controller is waited before transmission of a CFR (check for reception ready signal) in step S6. After transmission of the CFR, the reception operation of the next page is started.

If Q=MPS in step S1, the recovery command is sent in step S7. Thereafter, completion of the recovery operation is waited in step S8, and an MCF is transmitted to the transmitting station in step S9. Thereafter, the reception operation of the next page is started.

If Q=EOP (indicating that there is no next original) in step S1, a head preservation command is sent to the record controller in step S10. In step S11, an MCF is sent to the transmitting side, and reception is then ended.

FIG. 5 is a flow chart of the recovery operation of the record controller. Upon reception of a command (recovery command) from the main controller 1, the head is shifted from the print position to the recovery position in step S20. In step S21, the recovery operation such as ink supply or idle ejection is performed. In step S22, the head is returned from the recovery position to the print position again. In step S23, a flag indicating completion of the recovery operation is sent to the main controller 1.

FIG. 6 is a flow chart of the preservation operation. Upon reception of a command (preservation command) from the main controller 1, the head is shifted from the print position to the preservation position in step S30. In step S31, a capping operation is performed. These operations are examples of the preservation operation. In some apparatuses, the capping operation is automatically performed upon shift of the head, or a cap is driven.

In the above embodiment, communication control is performed by the main controller 1, and the head drive/ink supply control is performed by the record controller. However, all the control operations may be performed by the main controller.

As described above, the standby or preservation operation of the ink-jet head is performed depending on the type of Q, so that standby operation for next reception or reception end operation can be efficiently performed.

When the head is returned to the preservation position as soon as possible after completion of a reception operation, drying or evaporation of an ink or entrance of dust can be minimized.

In this embodiment, a recording operation is performed by a bubble-jet system. Any other systems may be employed, as a matter of course.

The recording head is not limited to a full-multi type recording head. For example, a head which serially scans a recording member to perform image recording may be employed.

What is claimed is:

1. An image communication apparatus adapted to communicate with another image communication apparatus, comprising:

communication means for communicating with the other image communication apparatus to send/receive image data and procedure signals associated with the communication of image data, said communication means ending a reception operation upon receiving a first procedure signal from the other image communication apparatus after the reception of one page of image data, and for transferring to a reception operation for subsequent image data upon receiving a second procedure signal;

recording means for ejecting a droplet of ink onto a recording member in accordance with image data received by said communication means;

recovery means for performing a predetermined recovery operation of said recording means;

determining means for determining, according to which procedure signal is 8 received by said communication means from the other image communication apparatus after the reception of one page of image data, whether or not a recovery operation by said recovery means is to be executed; and control means for causing said recover means to perform the predetermined recovery operation in accordance with a determination result by said determining means that a procedure signal received from the other image communication apparatus after the reception of one page of image data is the first procedure signal.

2. An apparatus according to claim 1, wherein the first-procedure signal is a signal indicating that there is another page of image data to be transmitted from the other apparatus upon completion of transmission therefrom of one page of image data.

3. An apparatus according to claim 1 or 2, wherein the recovery operation is not executed when the second procedure signal, which is a signal indicating that there is no additional image data to be transmitted from the other apparatus upon completion of transmission therefrom of one page of image data, is received.

4. An apparatus according to claim 3, further comprising preservation means for performing preservation processing of said recording means, wherein said preservation means performs preservation processing when the second procedure signal is received and is a signal indicating that there is no additional image data to be transmitted from the other apparatus upon completion of transmission therefrom of one page of image data.

5. An apparatus according to claim 1 or 2, wherein said communication means transmits to the other image communication apparatus a signal indicating completion of an image data reception standby operation after the predetermined recovery operation is completed.

6. An apparatus according to claim 1, wherein said recovery means supplies ink to said recording means to eject ink forcibly therefrom.

7. An apparatus according to claim 1, wherein the recovery operation includes an idle ejection operation by said recording means.

8. An apparatus according to claim 1 or 2, wherein said recording means has nozzles of one line corresponding to a width of the largest recording member which can be used in recording.

9. An apparatus according to claim 1 or 2, wherein said recording means comprises a plurality of nozzles and a plurality of energy generating elements driven according to the image data thereby ejecting ink.

10. An apparatus according to claim 9, wherein said recording means has nozzles of one line corresponding to a width of the largest recording member which can be used in recording.

11. An apparatus according to claim 9, wherein the energy generating elements comprise electro-thermal conversion elements for generating bubbles thereby ejecting ink.

12. An image communication apparatus adapted to communicate with another image communication apparatus, comprising:

communication means for receiving, from the other image communication apparatus, image data and a procedure signal associated with the communication of image data from the other image communication apparatus;

recording means for ejecting a droplet of ink onto a recording member in accordance with image data received by said communication means;

recovery means for performing a predetermined recovery operation of said recording means;

preservation means for performing a preservation operation for said recording means;

discriminating means for discriminating a procedure signal received by said communication means after the end of reception of one page of image data;

recovery control means for causing said recovery means to perform the predetermined recovery operation in accordance with a discrimination result by said discrimination means when the procedure signal indicates that additional image data to be transmitted from the other image communication apparatus is existent; and preservation control means for causing said preservation means to perform the preservation operation for said recovery means in accordance with a discrimination result by said discrimination means when the procedure signal indicates that additional image data to be transmitted from the other image communication apparatus is not existent.

13. An apparatus according to claim 12, wherein said recording means has nozzles of one line corresponding to a width of a largest recording member which can be used in recording.

14. An apparatus according to claim 12, wherein said recording means comprises a plurality of nozzles and a plurality of energy generating elements driven according to received image data.

15. An apparatus according to claim 14, wherein said recording means has nozzles of one line corresponding to a width of a largest recording member which can be used in recording.

16. An apparatus according to claim 14, wherein said energy generating elements comprise electro-thermal conversion elements for generating bubbles thereby ejecting ink.

17. An apparatus according to claim 12, wherein said communication means transmits to the other image communication apparatus a signal indicating completion of an image data reception standby operation after the predetermined recovery operation is completed.

18. An apparatus according to claim 17, wherein said recovery means supplies ink to said recording means to eject ink forcibly therefrom.

19. An apparatus according to claim 17, wherein the predetermined recovery operation includes an idle ejection operation by said recording means.

20. An apparatus according to claim 17, wherein said recording means has nozzles of one line corresponding to a width of the largest recording member which can be used in recording.

21. An apparatus according to claim 17, wherein said recording means comprises a plurality of nozzles and a plurality of energy generating elements driven according to received image data.

22. An apparatus according to claim 21, wherein said recording means has nozzles of one line corresponding to a width of the largest recording member which can be used in recording.

23. An apparatus according to claim 21, wherein the energy generating elements comprise electro-thermal conversion elements for generating bubbles thereby ejecting ink.

24. An image communication apparatus for recording an image on a recording material according to received data using a recording head having a plurality of recording elements for ejecting ink, the apparatus comprising:

communication means for communicating a procedure signal related to a communication between communication parties and for communicating image data;

first control means for controlling a communication operation of said communication means, wherein said first control means terminates the communication operation after reception of a page of image data if said communication means receives a first procedure signal and performs a receiving operation for a successive page of image data if said communication means receives a second procedure signal;

recovery means for performing a recovery process to recover an ink ejection condition of said recording head;

preservation means for performing a preservation process for said recording head; and second control means for controlling operation of said recovery means and said preservation means, wherein after said communication means receives the first procedure signal, said preservation means performs the preservation process, and after said communication means receives the second procedure signal, said recovery means performs the recovery process.

25. An apparatus according to claim 24, wherein when said communication means receives the first procedure signal, said first control means outputs a first signal to said second control means to cause said preservation means to perform the preservation process.

26. An apparatus according to claim 24, wherein when said communication means receives the second procedure signal, said first control means outputs a second signal to said second control means to cause said recovery means to perform the recovery process.

27. An apparatus according to claim 26, wherein when said communication means receives the first procedure signal, said first control means outputs a first signal to said second control means to cause said preservation means to perform the preservation process.

28. An apparatus according to claim 25 or 26, wherein if the second procedure signal is a procedure signal indicative of a presence of the successive original to be transmitted and a requirement of a mode change, said first control means provides through said communication means to the communication party a procedure signal after termination of the recovery process.

29. An apparatus according to claim 25 or 26, wherein if the second procedure signal is a procedure signal indicative of the presence of a successive original to be transmitted and the absence of a mode change, said first control means provides through said communication means to the communication party a procedure signal indicating satisfactory reception of an image signal after termination of the recovery processing and readiness for reception of a successive original.

30. An apparatus according to claim 25 or 26, wherein said recovery means performs the recovery process by filling up with ink.

31. An apparatus according to claim 25 or 26, wherein said recovery means performs the recovery process by causing said recording head to perform an idle ejection operation to eject ink not used for recording.

32. An apparatus according to claim 25 or 26, wherein said recording head includes plurality of recording elements arranged in a line corresponding to a recording area of the recording material.

33. An apparatus according to claim 25 or 26, wherein said recording head ejects ink by inducing a state change in the ink using thermal energy generated from said recording elements.

* * * * *

UNITED STATES PATENT AND TRADEMARK OFFICE

CERTIFICATE OF CORRECTION

PATENT NO. : 5,404,229
DATED : April 4, 1995
INVENTOR(S) : TAKESHI ONO, ET AL.

It is certified that error appears in the above-indentified patent and that said Letters Patent is hereby corrected as shown below:

COLUMN 2

Line 12, "PREFERRED" should read --DRAWINGS--.
Line 13, "EMBODIMENTS" should be deleted.

COLUMN 5

Line 18, "8" should be deleted.
Line 31, "first-procedure" should read --first procedure--.
Line 68, "data" should read --data,--.

Signed and Sealed this

Eighteenth Day of July, 1995

Attest:

BRUCE LEHMAN

*Attesting Officer* *Commissioner of Patents and Trademarks*